United States Patent
Li et al.

(10) Patent No.: US 7,231,349 B2
(45) Date of Patent: Jun. 12, 2007

(54) METHOD AND APPARATUS FOR COMPRESSING ASYMMETRIC CLUSTERING LANGUAGE MODELS

(75) Inventors: Mu Li, Beijing (CN); Jianfeng Gao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 977 days.

(21) Appl. No.: 10/448,498

(22) Filed: May 30, 2003

(65) Prior Publication Data

US 2004/0243411 A1  Dec. 2, 2004

(51) Int. Cl.
*G01L 15/06* (2006.01)
(52) U.S. Cl. ..................................... 704/245
(58) Field of Classification Search ............... None
See application file for complete search history.

(56) References Cited

U.S. PATENT DOCUMENTS

| | | | |
|---|---|---|---|
| 4,181,821 A * | 1/1980 | Pirz et al. ................ | 704/252 |
| 4,759,068 A * | 7/1988 | Bahl et al. ............... | 704/242 |
| 4,817,156 A * | 3/1989 | Bahl et al. ............... | 704/256.2 |
| 5,535,305 A * | 7/1996 | Acero et al. .............. | 704/256 |
| 5,590,242 A * | 12/1996 | Juang et al. ............. | 704/245 |
| 5,598,507 A * | 1/1997 | Kimber et al. ........... | 704/246 |
| 5,659,662 A * | 8/1997 | Wilcox et al. ............ | 704/245 |
| 5,787,394 A * | 7/1998 | Bahl et al. ................ | 704/238 |
| 2004/0193414 A1* | 9/2004 | Calistri-Yeh et al. ..... | 704/245 |

OTHER PUBLICATIONS

Jianfeng Gao, Joshua Goodman, Guihong Cao, Hang Li, Exploring Asymmetric Clustering for Statistical Language Modeling, ACL2002, University of Pennsylvania, Philadelphia, PA, USA, Jul. 6-12, 2002.

Edward Whittaker, Bhinksha Raj, Quantization-based Language Model Compression, Mitsubishi Electric Research Laboratories, Cambridge Massachusetts, Dec. 2001.

Philip Clarkson, Ronald Rosefeld, Statistical Language Modeling Using the CMU-Cambridge Toolkit, http://svr-www.eng.cam.ac.uk/-prc14/toolkit.html.

* cited by examiner

*Primary Examiner*—David D. Knepper
(74) *Attorney, Agent, or Firm*—Theodore M. Magee; Westman, Champlin & Kelly, P.A.

(57) ABSTRACT

A method and data structure are provided for efficiently storing asymmetric clustering models. The models are stored by storing a first level record for a word identifier and two second level records, one for a word identifier and one for a cluster identifier. An index to the second level word record and an index to the second level cluster record are stored in the first level record. Many of the records in the data structure include both cluster sub-model parameters and word sub-model parameters.

31 Claims, 5 Drawing Sheets

METHOD AND APPARATUS FOR COMPRESSING ASYMMETRIC CLUSTERING LANGUAGE MODELS

BACKGROUND OF THE INVENTION

The present invention relates to language models. In particular, the present invention relates to compressing language models for efficient storage.

Language models are used in a variety of applications including automatic translation systems, speech recognition, hand writing recognition and speech and text generation. In general, language models provide a likelihood of seeing a sequence of words in a language. One common language model is an n-gram language model that provides probabilities for observing n words in a sequence.

As n increases, the likelihood of observing particular sequences of words in a training text decreases. For example, it is much more likely that a sequence of two words, AB, will be found in a training text than a sequence of five words, ABCDE. When a particular sequence of words is not observed in the training text or is not observed often in the training text, the corresponding probability trained for the sequence will not provide an accurate reflection of the likelihood of the sequence in the language. For example, simply because a sequence of words such as "fly over Miami" does not appear in the training text does not mean that this sequence has zero probability of appearing in the English language.

To overcome this data sparseness problem, the prior art has developed a back-off scheme in which n-gram models for sequences of words that are not observed often are replaced with (n−1)-gram models multiplied by a back-off weight, $\alpha$, that is dependent upon the preceding n−1 words before the current word. For example, if trigram models are used in which n=3, the back-off probability would be a bigram probability that provides the probability of the current word given a preceding word and the back-off weight $\alpha$ would be dependent on the preceding word and the second preceding word.

For such models, a model probability must be stored for each level of n-gram from 1 to N, where N is the longest sequence of words supported by the language model. In addition, a back-off weight must be stored for each context in each n-gram. For example, for a trigram model with back-off weights, the following parameters must be stored (1) $P(w_i|w_{i-1}w_{i-2})$, (2) $P(w_i|w_{i-1})$, (3) $P(w_i)$, (4) $\alpha(w_{i-1}w_{i-2})$ and (5) $\alpha(w_{i-1})$.

To reduce the amount of storage space needed, one system of the prior art stored some of the probabilities and back-off weights together in a same record. This reduces the amount of space required to index the values. In particular, for two words $w_a$ and $w_b$, the bigram probability $P(w_a|w_b)$ would be stored with the back-off weight $\alpha(w_a w_b)$ This can be done because the record can be uniquely identified by word identifiers $w_a$ and $w_b$. Similarly, the probability $P(w_a)$ can be stored with back-off weight $\alpha(w_a)$. Thus, a unigram probability is stored with a bigram back-off weight and a bigram probability is stored with a trigram back-off weight.

Recently, a new type of language model known as a predictive clustering language model, which is a variant of asymmetric clustering models, has been developed. In general, an asymmetric clustering model can be parameterized as follows with trigram approximation:

$$P(w_i | h) = P(c_i | c_{i-1}c_{i-2}) \times P(w_i | c_{i-1}c_{i-2}c_i) \qquad \text{EQ. 1}$$

where $w_i$ denotes a word, h denotes a context, and $c_i$ denotes the cluster that $w_i$ belongs to. Asymmetric models use different clusters for predicted and conditional words, respectively. As an extreme case, in the predictive model, each conditional word is regarded as a cluster so it can be formally formulated as:

$$P(w_i|h)=P(c_i|w_{-1}w_{i-2})\times P(w_i|w_{i-1}w_{i-2}c_i) \qquad \text{EQ. 2}$$

From Equation 2, it can be seen that the parameter space is larger than that of a word-based language model and there are two sub-models in the predictive clustering model. One is the cluster sub-model $P(c_i|w_{i-1}w_{i-2})$ and the other is the word sub-model $P(w_i|w_{i-1}w_{i-2}c_i)$. Each of these sub-models are backed off independently. This creates the following back-off approximations:

$$P(c_i|w_{i-1}w_{i-2})=P(c_i|w_{i-1})\times\alpha(w_{i-1}w_{i-2}) \qquad \text{EQ. 3}$$

$$P(c_i|w_{i-1})=P(c_i)\times\alpha(w_{i-1}) \qquad \text{EQ. 4}$$

$$P(w_i|w_{i-1}w_{i-2}c_i)=P(w_i|w_{i-1}c_i)\times\alpha(w_{i-1}w_{i-2}c_i) \qquad \text{EQ. 5}$$

$$P(w_i|w_{i-1}c_i)=P(w_i|c_i)\times\alpha(w_{i-1}c_i) \qquad \text{EQ. 6}$$

From Equations 3 and 4, it can be seen that there are five types of parameters in the cluster sub-model that need to be stored. These include (1) $P(c_i|w_{i-1}w_{i-2})$, (2) $P(c_i|w_{i-1})$, (3) $\alpha(w_{i-1}w_{i-2})$, (4) $P(c_i)$ and (5) $\alpha(w_{i-1})$. From Equations 5 and 6, there are also five types of parameters that must be stored for the word sub-model. These include: (1) $P(w_i|w_{i-1}w_{i-2}c_i)$, (2) $P(w_i|w_{i-1}c_i)$, (3) $\alpha(w_{i-1}w_{i-2}c_i)$, (4) $P(w_i|c_i)$ and (5) $\alpha(w_{i-1}c_i)$.

It is not possible to combine these parameters in the same way in which the word-based model parameters were combined. Specifically, the bigram probability $P(c_i|w_{i-1})$ cannot be stored with the trigram back-off weight $\alpha(w_{i-1}w_{i-2})$ because they require different indexing keys. Similarly, $P(c_i)$ cannot be stored with $\alpha(w_{i-1})$. In the word sub-model, back-off weight $\alpha(w_{i-1}w_{i-2}c_i)$ and probability $P(w_i|w_{i-1}w_{i-2}c_i)$ cannot be stored together nor can back-off weight $\alpha(w_{i-1}c_i)$ and $P(w_i|c_i)$ because they have different indexing keys.

Traditionally, four trees have been stored to store these parameters with one tree for each sub-model used to store probability parameters and one tree for each sub-model used to store back-off weights. The deficiency of this approach is that in each tree there is a separate indexing data structure. As a result, the indexing data structure is duplicated in the multiple tree structures creating an overall model size that is much larger than the word-based model given the same training corpus. Thus, a system is needed to improve the efficiency of storing predictive clustering language models.

SUMMARY OF THE INVENTION

A method and data structure are provided for efficiently storing asymmetric clustering models. The models are stored by storing a first level record for a word identifier and two second level records, one for a word identifier and one for a cluster identifier. An index to the second level word record and an index to the second level cluster record are stored in the first level record. Many of the records in the data structure include both cluster sub-model parameters and word sub-model parameters.

DETAILED DESCRIPTION OF ILLUSTRATIVE EMBODIMENTS

Figure 1:
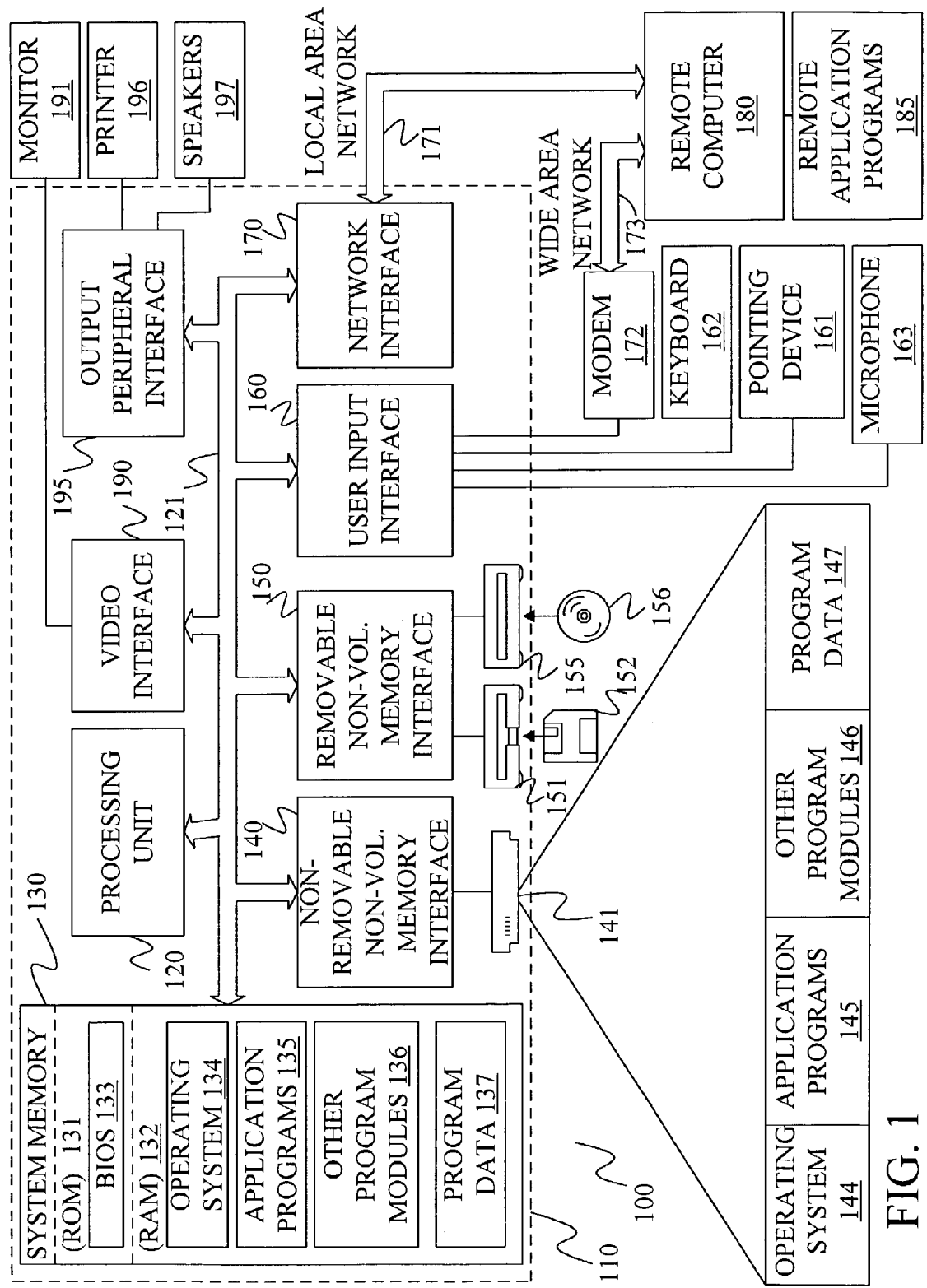
FIG. 1 is a block diagram of an exemplary general purpose computer system suitable for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
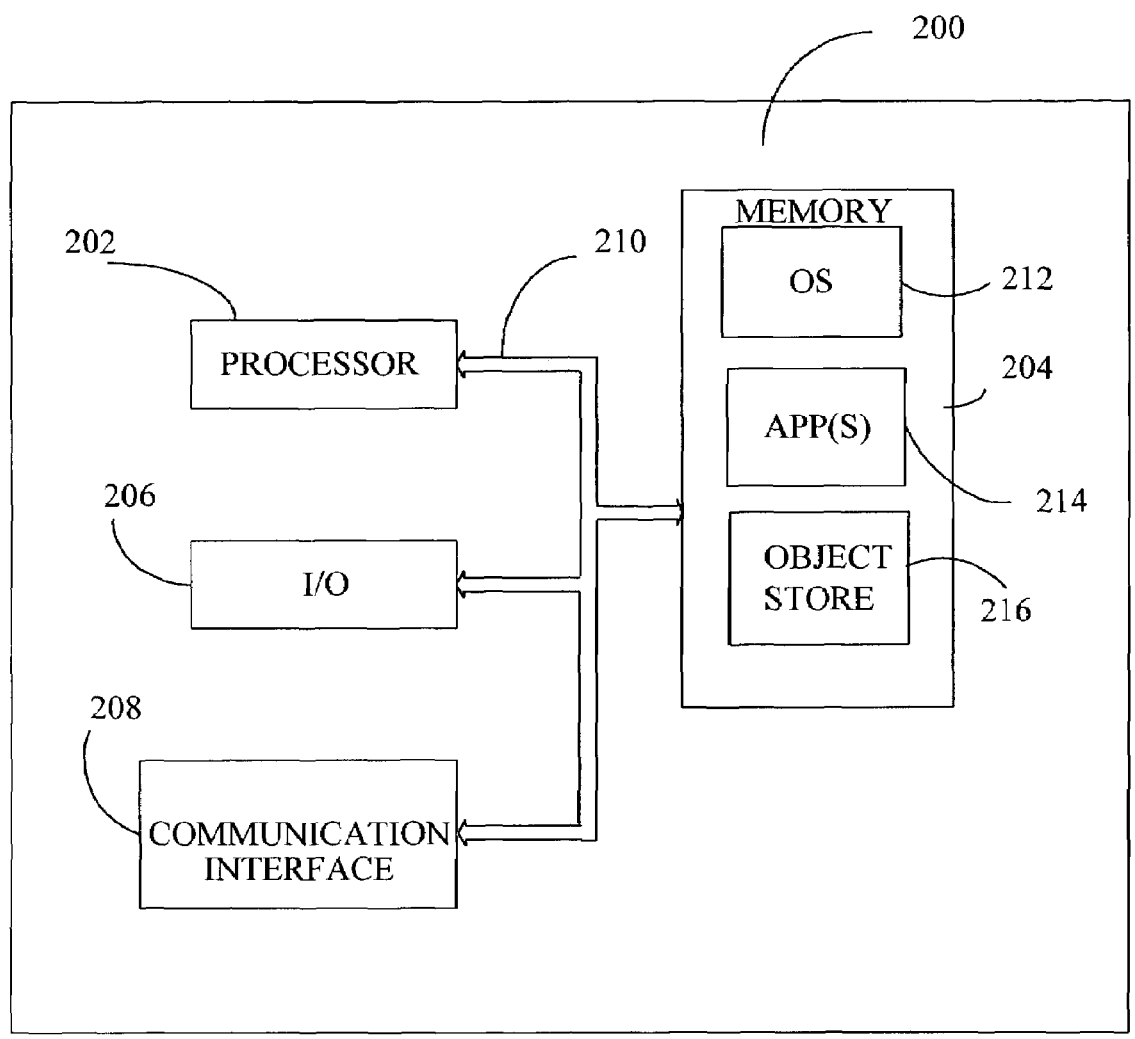
FIG. 2 is a block diagram of a hand-held device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention provides a method of storing a predictive clustering model so that it occupies less space and is thereby more efficiently stored.

Figure 3:
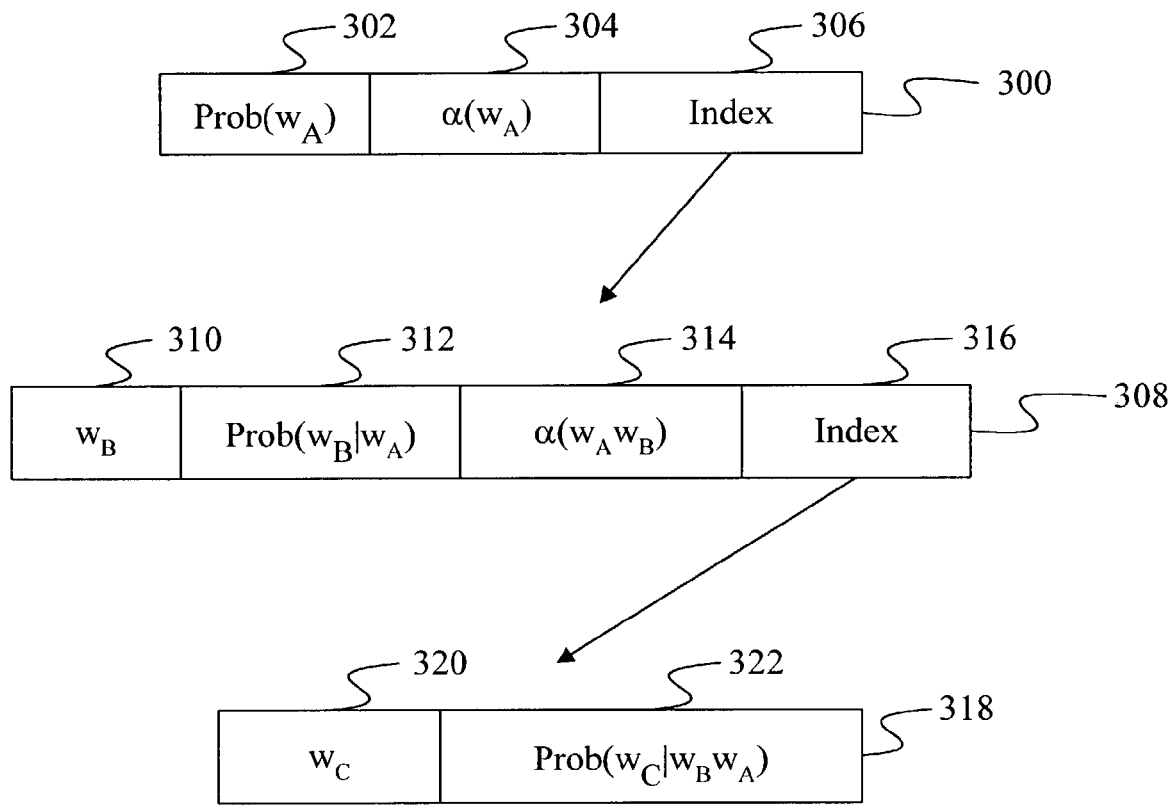
FIG. 3 is a tree structure used to store a word-based language model under the prior art.

In the past, word-based language models have been stored using a tree structure such as that shown in FIG. 3. The tree structure of FIG. 3 is for a trigram model and consists of records at three different levels. Each record consists of elements that can include probabilities and/or back-off weights.

Records at the top most level, such as record 300 of FIG. 3, are implicitly indexed by a single word identifier. In general, the word identifier is not included in the record because the records are stored such that the location of the record is known given a particular word identifier. The top-most records include a unigram probability for $P(w_i)$ and a back-off weight $\alpha(w_{i-1})$, where $w_i$ and $w_{i-1}$ are the word identifier associated with the record. In the example of FIG. 3, record 300 is for a word identifier $w_A$ and thus includes a probability 302 of $P(w_A)$ and a back-off weight 304 of $\alpha(w_A)$. Thus, the probability and back-off weight stored in the record are for the same word identifier but are used at different times. Specifically, the probability is used to determine the probability of the word identifier when the word identifier is a current word identifier while the back-off weight is used when the word identifier is a preceding word identifier.

Each record in the top level of records also includes an index that points to a group of records in the second level of records that represent word identifiers that can follow the word identifier associated with the top level record. For example, record 300 includes an index 306 that points to a group of records such as record 308. Note that although only a single record is shown in the second level of FIG. 3, those skilled in the art will recognize index 306 will typically point to a large number of records in the second level of records.

Each record in the second level includes the word identifier associated with the record, a bigram probability $P(w_i|w_{i-1})$, a back-off weight $\alpha(w_i w_{i-1})$ and an index to records in the third level of the tree structure. The bigram probability provides the probability of the word identifier in this record given the preceding word identifier in the record of the top level that points to this record. For example, in FIG. 3, the word identifier 310 is word identifier $w_B$ and the bigram probability 312 is the probability $P(w_B|w_A)$, where $w_A$ is the word identifier of record 300. The back-off weight is the back-off weight used to calculate a trigram probability and is associated with the word identifier of the current record of the second level and the word identifier in top level record that points to this record. In the example of FIG. 3, the back-off weight 314 is associated with $w_B$ and $w_A$, where word identifier $w_B$ is considered the previous word identifier $w_{i-1}$ and word identifier $w_A$ is considered the next previous word identifier $w_{i-2}$.

The index of a second level record, such as index 316 of FIG. 3, points to a group of records in the third level of the tree that represent word identifiers that can follow the sequence of the word identifier in the first level record followed by the word identifier in the second level record. In FIG. 3, this sequence is $w_B w_A$. Each record in the third level includes a word identifier and a trigram probability $P(w_i|w_{i-1} w_{i-2})$. In the example of FIG. 3, record 318 in the third level contains word identifier 320, $w_C$, and trigram probability 322, $P(w_C|w_B w_A)$.

The structure of FIG. 3 cannot be applied directly to predictive clustering models because the clusters of the models require different indexing than the words. Thus, the clustering probabilities cannot be combined directly with the word back-off weights in the same records. Because of this, the prior art has generated a four tree storage structure as shown in FIG. 4.

Figure 4:
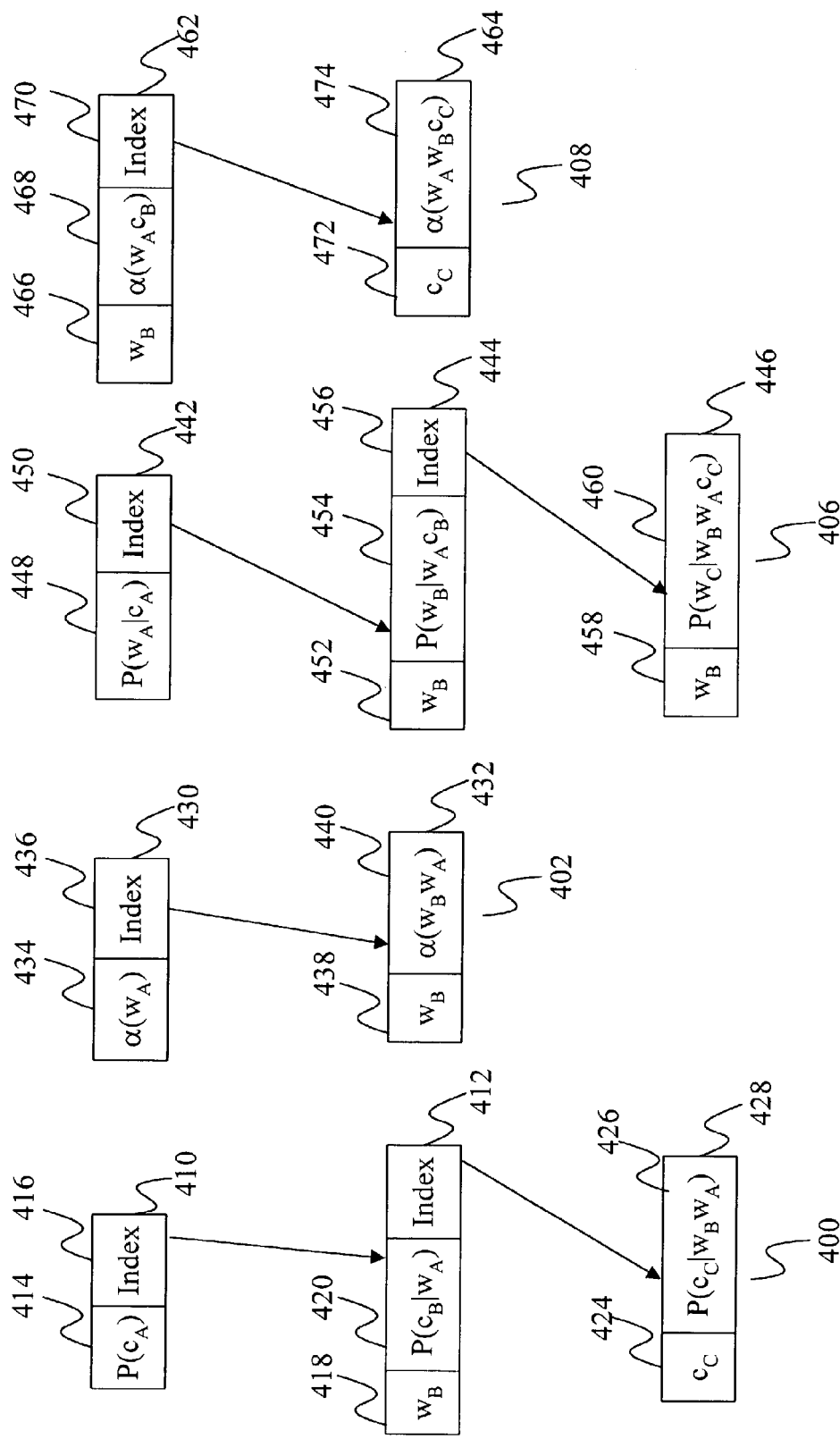
FIG. 4 is a tree structure used to store a predictive clustering model under the prior art.

In FIG. 4, trees 400 and 402 are provided for the cluster sub-model and trees 406 and 408 are provided for the word sub-model. Trees 400 and 406 contain probabilities while trees 402 and 408 contain back-off weights.

In tree 400, records in a first level contain a unigram probability for a cluster $P(c_i)$ and an index to records in a second layer of tree 400. In the first layer, there is a separate record for each word in the vocabulary. For example, in FIG. 4, record 410 is for a word identifier $w_A$, which is a member of a cluster represented by cluster identifier $c_A$. As such, record 410 contains the unigram probability 414 of $P(c_A)$.

Records in the second level of tree 400 include a word identifier, a bigram probability $P(c_i|w_{i-1})$ and an index to a record in the third level tree 400. For example, in FIG. 4, index 416 of record 410 points to record 412 in the second level of the tree. Record 412 includes a word identifier 418 for the word identifier $w_B$ and a bigram probability 420 of $P(c_B|w_A)$. A separate record is provided for each word identifier that can follow the word identifier of record 410. The bigram probability in a second level record is the probability of the cluster identifier to which the word identifier of the record belongs given the preceding word identifier in the record of the first level. For example, in FIG. 4, the probability is $P(c_B|w_A)$, where word identifier $w_B$ is a member of the cluster represented by cluster identifier $c_B$.

The index of a second level record points to records in a third level of tree 400. For example, index 412 points to a record 428 in the third level of tree 400. Each record in the third level of the tree includes a cluster identifier and a trigram probability $P(c_i|w_{i-1} w_{i-2})$. The trigram probability is the probability of the cluster identifier of third level record given the preceding word identifiers of the first and second level records that lead to the third level record. For example, in FIG. 4, third level record 428 contains cluster identifier 424, $c_C$, and trigram probability 426, $P(c_C|w_B w_A)$.

Tree 402 includes two levels of records. In the first level, a separate record is provided for each word in the language and includes a back-off weight $\alpha(w_{i-1})$ based on the word identifier of the record and an index to records in the second level. For example, record 430 of FIG. 4 is for word identifier $w_A$ and contains a back-off weight $\alpha(w_A)$ and an index 436 that points to second level record 432.

Records in the second level of tree 402 include a word identifier and a back-off weight $\alpha(w_{i-1} w_{i-2})$, where $w_{i-1}$ is replaced with the word identifier of the second level record and $w_{i-2}$ is replaced with the word identifier associated with first level record that points to the second level record. For example, in FIG. 4, record 432 contains a word identifier 438 of $w_B$ and a back-off weight 440 of $\alpha(w_B w_A)$.

Tree 406 includes three record levels. Records in the first level of tree 406 are provided for each word in the language and include a probability $P(w_i|c_i)$, which describes the likelihood of the word identifier associated with the record given the cluster identifier for the cluster of the word identifier. Each first level record also includes an index that points to records in the second layer of tree 406. For example, in FIG. 4, first level record 442 is for word identifier $w_A$ and contains a probability 448 of $P(w_A|c_A)$ and an index 450 that points to second level record 444.

The second level records of tree 406 include a word identifier, and a bigram probability $P(w_i|w_{i-1} c_i)$, where $w_i$ is the word identifier of the second level record, $w_{i-1}$ is the word identifier in the first level record that points to this second level record and $c_i$ is the cluster identifier for the cluster of the word identifier of the second level record. For example, in FIG. 4, record 444 has a word identifier 452 of $w_B$ and a bigram probability of $P(w_B|w_A c_B)$, where $c_B$ is the cluster identifier for the cluster of word identifier $w_B$.

Each second level record also includes an index that points to records in the third level of tree 406. For example, record 444 includes index 456, which points to third level record 446.

Records in the third level of tree 406 include a word identifier for the record and a trigram probability $P(w_i|w_{i-1} w_{i-2} c_i)$, where $w_i$ is the word identifier of the third level record, $w_{i-1}$ is the word identifier of the second level record that points to this third level record, $w_{i-2}$ is the word identifier associated with the first level record that points to the second level record, and $c_i$ is the cluster identifier for the cluster of the word identifier of the third level record. For example, in FIG. 4, record 446 contains a word identifier 458 of $w_C$, and a trigram probability 460 of $P(w_C|w_B w_A c_C)$, where $c_C$ is the cluster identifier for the cluster of word identifier $w_C$.

Tree 408 includes two levels of records. Each record in the first level includes a word identifier and a back-off weight of $\alpha(w_{i-1} c_i)$, where $w_{i-1}$ is replaced with a word identifier associated with the record and $c_i$ is the cluster identifier for the cluster of the word identified in the word identifier field. For example, in FIG. 4, first level record 464 is associated with word identifier $w_A$ and word identifier $w_B$ is found in word identifier field 466. Back-off weight 468 thus becomes $\alpha(w_A c_B)$, where $c_B$ is the cluster identifier for the cluster of word identifier $w_B$.

First level records of tree 408 also include an index, such as index 470 of record 462, which points to records in the second level of the tree.

Each second level record of tree 408 includes a cluster identifier and a back-off weight $\alpha(w_{i-1} w_{i-2} c_i)$, where $w_{i-1}$ is the word identifier in the word identifier field of the first level record, $w_{i-2}$ is the word identifier associated with the first level record and $c_i$ is the cluster identifier of the second level record. For example, in FIG. 4, second level record 464 contains a cluster identifier 472 of $c_C$ and a back-off weight 474 of $\alpha(w_B w_A c_C)$.

As can be seen in FIG. 4, the addition of clusters requires a large increase in the storage size of the language model since a larger number of indexes are needed to index all four trees.

Figure 5:
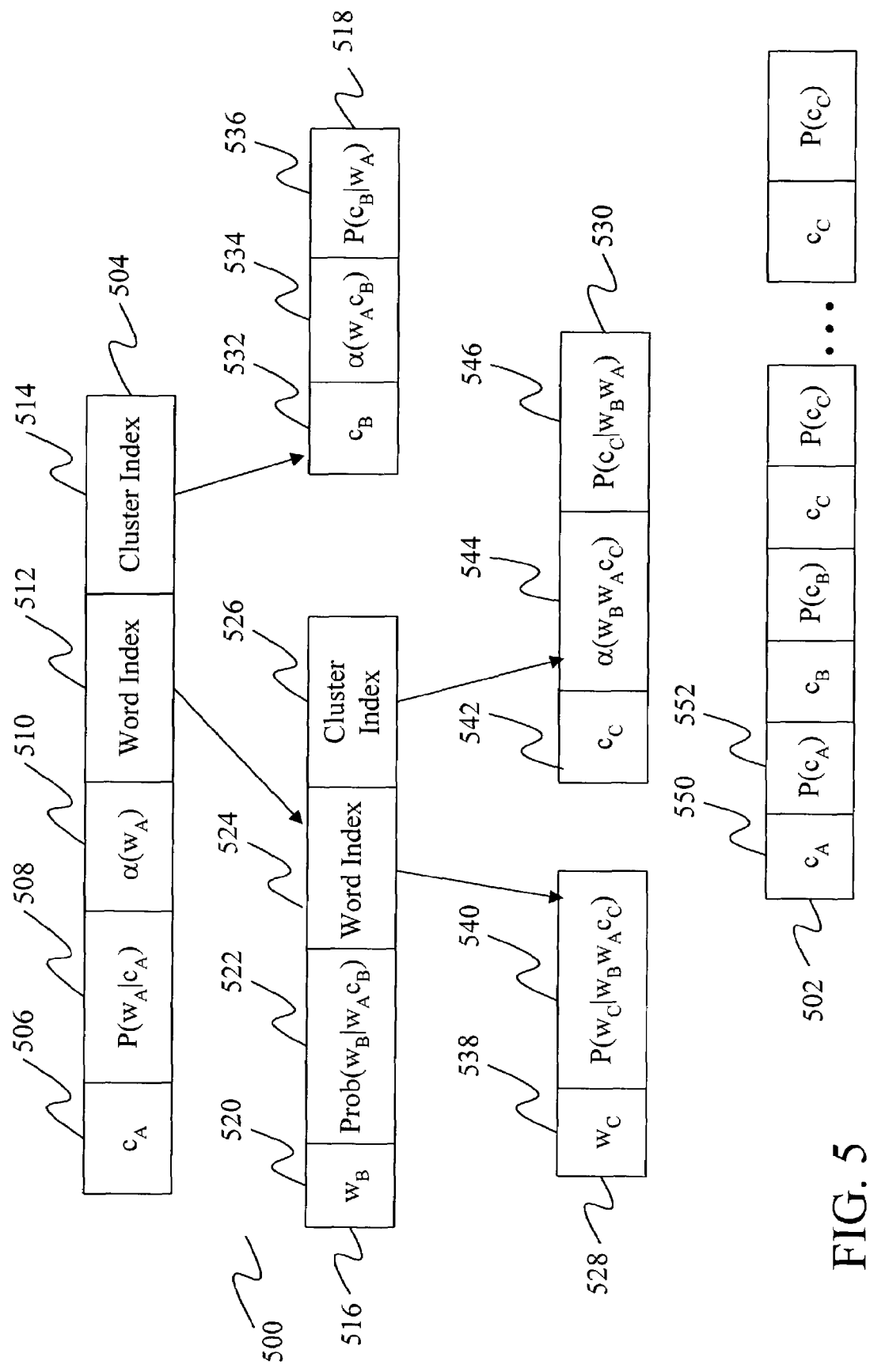
FIG. 5 is a tree structure under the present invention for storing a predictive clustering model.

The present invention provides a means for reducing the amount of indexing required to store the parameters of a predictive clustering model. In particular, as shown in FIG. 5, the present invention provides a tree structure 500 and a record list 502 for storing the predictive clustering model parameters.

Tree 500 includes a first layer of records that is formed of a cluster identifier, a probability $P(w_i|c_i)$, where $w_i$ is replaced with the word identifier associated with the record and $c_i$ is replaced with the cluster identifier associated with the record. Each first level record also includes a back-off weight $\alpha(w_{i-1})$, where $w_{i-1}$ is replaced with the word identifier associated with the record. For example, in FIG. 5, first level record 504 is associated with word identifier $w_A$ and has a cluster identifier 506 of $c_A$ so that the back-off weight 510 is $\alpha(w_A)$ and probability 508 is $P(w_A|c_A)$.

Each first level record also includes a word index and a cluster index. The word index points to a second level of word records and the cluster index points to a second level of cluster records. For example, word index 512 of record 504 points to word record 516 and cluster index 514 points to cluster record 518. Note that although a single second level word record and a single second level cluster record are shown, those skilled in the art will recognize that the word index and cluster index actually point to a sequence of second level records that are sorted by the word identifier 520 or cluster identifier 532. Such arrangements ensure the efficient retrieval of second level records via the binary search algorithm.

Each second level word record, such as word record 516, includes a word identifier, a bigram probability, a word index and a cluster index. The bigram probability is $P(w_i|w_{i-1} c_i)$, where $w_i$ is replaced with the word identifier of the second level word record, $w_{i-1}$ is the word identifier associated with the first level record that points to the second level word record and $c_i$ is the cluster identifier for the cluster of the word identifier of the second level record. Note that the cluster identifier $c_i$ does not have to be indexed independently since word identifier $w_i$ is only a member of one cluster. As such, identifying the word identifier implicitly identifies the cluster identifier. For example, word record 516 contains a word identifier 520 of $w_B$ and a probability 522 of $P(w_B|w_A c_B)$, where $c_B$ is the cluster identifier of word identifier $w_B$.

The word index of the second level word record points to a third level word record while the cluster index points to a third level cluster record. Thus, in FIG. 5, word index 524 points to a third level word record 528 and cluster index 526 points to a third level cluster record 530. Note that although a single third level word record and a single third level cluster record are shown, those skilled in the art will recognize that the word index and cluster index actually point to a sequence of third level records that are sorted by the word identifier 538 or cluster identifier 542. Such arrangements ensure the efficient retrieval of third level records via the binary search algorithm.

Each second level cluster record includes a cluster identifier, and a back-off weight $\alpha(w_{i-1} c_i)$ where $w_{i-1}$ is replaced with the word associated with the first level record that points to this cluster record and $c_i$ is the cluster identifier for this second level cluster record. Each second level cluster record also includes a probability $P(c_i|w_{i-1})$, where $c_i$ is replaced with the cluster identifier of the cluster record and $w_{i-1}$ is replaced with the word associated with the first level record that points to this cluster record.

In FIG. 5, second level cluster record 518 includes a cluster identifier 532 of $c_B$, a back-off weight 534 of $\alpha(w_A c_B)$, and a probability 536 of $P(c_B|w_A)$.

Each third level word record consists of a word identifier and a trigram probability $P(w_i|w_{i-1} w_{i-2} c_i)$ in which $w_i$ is replaced with the word identifier of the third level word record, $w_{i-1}$ is the word identifier of the second level word record that points to this third level word record, $w_{i-2}$ is the word identifier associated with the first level record that points to the second level word record, and $c_i$ is the class identifier associated with the word identifier of the third level word record.

For example, in FIG. 5, third level word record 528 includes a word identifier 538 of $w_C$ and a probability 540 of $P(w_C|w_B w_A c_C)$, where $c_C$ is the cluster identifier of word identifier $w_C$.

Each third layer cluster record includes a cluster identifier and a back-off weight $\alpha(w_{i-1} w_{i-2} c_i)$ where $w_{i-1}$ is replaced by the word identifier of the second level word record that points to this third level cluster record, $w_{i-2}$ is replaced with the word identifier associated with the first level word record that points to the second level word record, and $c_i$ is replaced with the cluster identifier for this record. Third level cluster records also include probabilities $P(c_i|w_{i-1} w_{i-2})$ where $c_i$ is the cluster identifier of this record, $w_{i-1}$ is the word identifier of the second level record that points to this record and $w_{i-2}$ is the word identifier associated with the first level record that points to the second level word record.

Thus, in FIG. 5, cluster record 530 includes a cluster identifier 542 of $c_C$, a back-off weight 544 of $\alpha(w_B w_A c_C)$ and a probability 546 of $P(c_C|w_B w_A)$.

By introducing the idea of a cluster index in addition to a word index, the present invention is able to combine many of the parameters into a unified tree 500 and thereby avoid generating multiple trees to represent the predictive clustering model. In addition, the present inventors have been able to combine certain probabilities and back-off weights into single records to thereby reduce the amount of storage space required.

Unified tree 500 does not include the unigram probability $P(c_i)$. Although this probability could be added to record 504, it is more efficient to keep it in a separate record list 502, which consists of a separate record for each cluster. Each cluster record includes a cluster identifier such as cluster identifier 550 and a unigram probability such as unigram probability 552 which is $P(c_i)$. Thus, for the cluster $c_A$, the probability would be $P(c_A)$.

Although the present invention has been described with reference to particular embodiments, workers skilled in the art will recognize that changes may be made in form and detail without departing from the spirit and scope of the invention.

What is claimed is:

1. A method of storing parameters for an asymmetric clustering model the method comprising:
   storing a first level word record for a word identifier;
   storing a second level cluster record for a cluster identifier;
   storing a second level word record for a word identifier;
   placing an index to the second level cluster record in the first level word record; and
   placing an index to the second level word record in the first level word record.

2. The method of claim 1 further comprising storing a word sub-model parameter and a cluster sub-model parameter in the first level word record.

3. The method of claim 2 wherein the word sub-model parameter comprises a probability of the word identifier of the first level word record given a cluster identifier for the word identifier.

4. The method of claim 3 wherein the cluster sub-model parameter comprises a back-off weight associated with the word identifier of the first level word record.

5. The method of claim 1 further comprising storing a word sub-model parameter and a cluster sub-model parameter in the second level cluster record.

6. The method of claim 5 wherein the word sub-model parameter of the second level cluster record comprises a back-off weight associated with the word identifier of the first level word record and the cluster identifier of the second level cluster record.

7. The method of claim 5 wherein the cluster-sub-model parameter of the second level cluster record comprises a probability of the cluster identifier of the second level cluster record given the word identifier of the first level word record.

8. The method of claim 1 further comprising storing a word sub-model parameter in the second level word record.

9. The method of claim 8 wherein the word sub-model parameter in the second level word record comprises a probability of the word identifier of the second level word record given the cluster identifier of the word identifier of the second level word record and the word identifier of the first level word record.

10. The method of claim 1 further comprising storing a third level cluster record for a cluster identifier.

11. The method of claim 10 further comprising placing an index to the third level cluster record in the second level word record.

12. The method of claim 10 further comprising storing a word sub-model parameter and a cluster sub-model parameter in the third level cluster record.

13. The method of claim 12 wherein the word sub-model parameter comprises a back-off weight associated with the cluster identifier of the third level cluster record, the word identifier of the second level word record and the word identifier of the first level word record.

14. The method of claim 12 wherein the cluster sub-model parameter comprises a probability of the cluster identifier of the third level cluster record given the word identifier of the second level word record and the word identifier of the first level word record.

15. The method of claim 1 further comprising storing a third level word record for a word identifier.

16. The method of claim 15 further comprising placing an index to the third level word record in the second level word record.

17. The method of claim 15 further comprising storing a probability of the word identifier of the third level word record given a cluster identifier of the word identifier of the third level word record, the word identifier of the second level word record and the word identifier of the first level word record.

18. A computer-readable medium having a data structure stored thereon, comprising:
   a second level record;
   a first level record comprising:
      a cluster sub-model parameter field having a cluster sub-model parameter that is based in part on a word identifier;
      a word sub-model parameter field having a word sub-model parameter that is based in part on the word identifier; and
      an index to the second level record.

19. The computer-readable medium of claim 18 wherein the cluster sub-model parameter comprises a back-off weight associated with the word identifier.

20. The computer-readable medium of claim 18 wherein the word sub-model parameter comprises a probability of the word identifier given a cluster identifier of a cluster to which the word identifier belongs.

21. The computer-readable medium of claim 18 wherein the second level record comprises a cluster record comprising:
   a cluster sub-model parameter field having a cluster sub-model parameter that is based in part on a cluster identifier associated with the second level record; and
   a word sub-model parameter field having a word sub-model parameter that is based in part on the cluster identifier associated with the second level record.

22. The computer-readable medium of claim 21 wherein the cluster sub-model parameter is a probability of the cluster identifier associated with the second level record given the word identifier of first level record.

23. The computer-readable medium of claim 21 wherein the word sub-model parameter is a back-off weight associated with the cluster identifier associated with the second level record and the word identifier of the first level word record.

24. The computer-readable medium of claim 18 wherein the second level record comprises a word record associated with a word identifier and having a word sub-model parameter field containing a word sub-model parameter.

25. The computer-readable medium of claim 24 wherein the word sub-model parameter of the second level record comprises a probability of the word identifier associated with the second level record given a cluster identifier for the word identifier associated with the second level record and the word identifier of the first level record.

26. The computer-readable medium of claim 24 further comprising a third level record wherein the second level record further comprises an index to the third level record.

27. The computer-readable medium of claim 26 wherein the third level record comprises a cluster record comprising:
   a cluster sub-model parameter field having a cluster sub-model parameter that is based in part on a cluster identifier associated with the third level record; and
   a word sub-model parameter field having a word sub-model parameter that is based in part on the cluster identifier associated with the third level record.

28. The computer-readable medium of claim 27 wherein the cluster sub-model parameter is a probability of the cluster identifier associated with the third level record given the word identifier associated with the second level record and the word identifier of first level record.

29. The computer-readable medium of claim 27 wherein the word sub-model parameter is a back-off weight associated with the cluster identifier associated with the third level record, the word identifier associated with the second level record and the word identifier of the first level record.

30. The computer-readable medium of claim 26 wherein the third level record comprises a word record associated with a word identifier and having a word sub-model parameter field containing a word sub-model parameter.

31. The computer-readable medium of claim 30 wherein the word sub-model parameter of the third level record comprises a probability of the word identifier associated with the third level record given a cluster identifier of a cluster to which the word identifier of the third level record belongs, the word identifier associated with the second level record and the word identifier of the first level record.

\* \* \* \* \*